United States Patent
Bunsendal et al.

(10) Patent No.: US 8,904,899 B2
(45) Date of Patent: Dec. 9, 2014

(54) DELTA ROBOT FOR INCREASED REQUIREMENTS ON DYNAMICS, HYGIENE AND PROTECTION AGAINST THE CONSEQUENCES OF COLLISION

(75) Inventors: Jens Bunsendal, Marktheidenfeld (DE); Christian Hombach, Guntersleben (DE)

(73) Assignee: Schneider Electric Automation GmbH, Marktheidenfeld (DE)

( * ) Notice: Subject to any disclaimer, the term of this patent is extended or adjusted under 35 U.S.C. 154(b) by 331 days.

(21) Appl. No.: 13/145,594

(22) PCT Filed: Jan. 27, 2010

(86) PCT No.: PCT/DE2010/000089
§ 371 (c)(1),
(2), (4) Date: Jul. 21, 2011

(87) PCT Pub. No.: WO2010/085943
PCT Pub. Date: Aug. 5, 2010

(65) Prior Publication Data
US 2011/0277581 A1    Nov. 17, 2011

(30) Foreign Application Priority Data
Jan. 30, 2009 (DE) .......................... 10 2009 006 833

(51) Int. Cl.
*B25J 17/00* (2006.01)
*B25J 18/00* (2006.01)
*B25J 17/02* (2006.01)
*B25J 9/00* (2006.01)

(52) U.S. Cl.
CPC .............. *B25J 17/0266* (2013.01); *B25J 18/00* (2013.01); *B25J 9/0009* (2013.01); *B26J 9/0051* (2013.01); *Y10S 901/14* (2013.01)
USPC ........................................ 74/490.01; 901/14

(58) Field of Classification Search
CPC ...... B25J 9/009; B25J 9/0051; B25J 17/0266; B25J 17/0275; B25J 18/00
USPC ................ 74/490.01, 490.05; 901/14, 15, 28; 403/76, 114, 122, 128
See application file for complete search history.

(56) References Cited

U.S. PATENT DOCUMENTS 3,539,234 A * 11/1970 Rapata .......................... 384/203
5,333,514 A    8/1994 Toyama et al. ................. 74/479

(Continued)

FOREIGN PATENT DOCUMENTS

DE     202005017588         3/2006
DE     10 2007 004 379 A1   7/2008

(Continued)

OTHER PUBLICATIONS

International Search Report for PCT/DE2010/000089, date of mailing Dec. 5, 2010, 6 pages.

(Continued)

*Primary Examiner* — Justin Krause
(74) *Attorney, Agent, or Firm* — Westman, Champlin & Koehler, P.A.

(57) ABSTRACT

A delta robot includes a stationary housing, in which at least three drives are installed, at least three upper arms, at least three pairs of elongate and mutually parallel lower arms, and a movable parallel plate. Each of the upper arms is connected to one of the drives. Each lower arm comprises a corrosion-resistant metal tube having a first end connected to a free end of one of the upper arms through a ball joint and a second end connected to the movable parallel plate through a ball joint. Each ball joint includes a ball head and a ball socket, one of which is attached to the first or second end of one of the tubes.

15 Claims, 3 Drawing Sheets

(56) References Cited

U.S. PATENT DOCUMENTS

| | | | |
|---|---|---|---|
| 5,692,412 A | 12/1997 | Rosheim | 74/490.05 |
| 6,419,211 B1* | 7/2002 | Hvittfeldt et al. | 267/69 |
| 6,577,093 B1 | 6/2003 | Hvittfeldt et al. | 318/568.11 |
| RE39,521 E* | 3/2007 | Herrington | 242/609.4 |
| 2006/0213308 A1 | 9/2006 | Rosheim | 74/490.01 |
| 2006/0292019 A1* | 12/2006 | Bode et al. | 417/423.7 |
| 2008/0118301 A1* | 5/2008 | Nishio et al. | 403/122 |
| 2010/0037721 A1* | 2/2010 | Nakao et al. | 74/490.05 |
| 2010/0101359 A1 | 4/2010 | Breu et al. | |
| 2010/0263471 A1* | 10/2010 | Weber | 74/490.06 |
| 2011/0259138 A1* | 10/2011 | Hombach et al. | 74/490.05 |

FOREIGN PATENT DOCUMENTS

| | | |
|---|---|---|
| DE | 10 2008 062 958 A1 | 7/2010 |
| DE | 10 2008 063 869 A1 | 7/2010 |
| EP | 0937551 | 7/1998 |
| FR | 2856948 | 4/2004 |
| WO | WO 2008059659 A1 * | 5/2008 |
| WO | 2008092710 A1 | 8/2008 |
| WO | WO 2010069298 A1 * | 6/2010 |

OTHER PUBLICATIONS

Notification of Transmittal of Translation of the International Preliminary Report on Patentability for PCT/DE2010/000089 filed Jan. 27, 2010; date of mailing is Aug. 11, 2011, 8 pages.

Notification Concerning Transmittal of International Preliminary Report on Patentability for PCT/DE2010/000089 filed Jan. 27, 2010; 8 pages, date of mailing is Aug. 11, 2011, 7 pages.

ABB AB Product specification for "Parallel robot" Robotics Products (2009-2010), 54 pgs., Sweden.

"Paloma Top Loader: Placing product into a carton, case or tray with the amazing speed and precision of a Delta Robot" Bosch Packaging Technology, Inc. (2008), 2 pgs., USA.

* cited by examiner

DELTA ROBOT FOR INCREASED REQUIREMENTS ON DYNAMICS, HYGIENE AND PROTECTION AGAINST THE CONSEQUENCES OF COLLISION

CROSS-REFERENCE TO RELATED APPLICATION

This Application is a Section 371 National Stage Application of International Application No. PCT/DE2010/000089, filed 27 Jan. 2010 and published as WO 2010/085943 on 5 Aug. 2010, in English, which also claims priority to German Patent Application No. 102009006833.3 filed on Jan. 30, 2009, the contents of which are hereby incorporated by reference in their entirety.

FIELD

The invention relates to a delta robot, comprising a stationary housing, in which at least three drives are installed and on which at least three upper arms are mounted such that they are pivotable about an axle in each case and are in each case connected to a drive, and at their free ends are connected to a pair of elongate and mutually parallel lower arms via one ball joint in each case, and at their other end are connected to a movable parallel plate via a further ball joint in each case, a ball head or a ball socket being fixed at both ends of each lower arm as part of a ball joint.

BACKGROUND

In the prior art, delta robots have proven their worth in particular for the highly dynamic handling of relatively lightweight objects—such as the packaging of foods in small amounts or medication—since they permit extremely high dynamics of up to three packaging operations per second.

The first delta robots comprised three upper arms. However, variants with four and more upper arms are known.

In each case, three and in some cases four elongate upper arms are mounted so as to be pivotable about an axle in each case. At the free ends thereof, two mutually parallel rods are pivotably mount, which in turn are in pivotable connection with the parallel plate. By a swivelling of the servo drives, the parallel plate can be maneuvered into any desired position of the intended work space. Because the lower arms consist of two parallel rods, the parallel plate thus always moves—as its name suggests—parallel to the base plate.

In the prior art, most delta robots consist of a base plate on which three servo drives are mounted. For applications in hygienically critical areas, such as the production of foods, pharmaceuticals or electronic devices, the base plate is extended within a housing so that lubricants and any abrasion debris from the drives and/or the transmission cannot detach and fall into the product.

In the prior art, the U.S. Pat. No. 6,577,093, Hvittfeldt, discloses a delta robot for hygiene requirements, in which all drives are disposed within a housing. It is thereby avoided that lubricants or abrasion debris from the bearings of the motor and drive escape and thereby contaminate an otherwise hygienic environment. A further, very important advantage is that the housing can also be made of a material that can withstand the very corrosive cleaning agents for equipment in food processing.

However U.S. Pat. No. 6,577,093 disadvantageously gives no indication how it is ensured that the areas of the robot outside the housing, that is to say the arms and the joints of the robot, do not emit contamination during operation and in the event of collisions.

Similarly, there are no indications of how the arms and joints can be adapted to the requirement for maximum dynamics. As is known, a high obtainable cycle rate is always the reason why the principle of a delta robot is chosen at all. For slow movements, simple linear handling may be more suitable. The requirement for high dynamics is thus already implied in the choice of a delta robot.

Despite the stated object of satisfying hygienic requirements, that is to say withstanding the effects of the most aggressive cleaning agents, proposals to this end are lacking. The consequences of a collision are also not discussed.

However, it is quite clear that, for robots with extremely high dynamics, elements of the lowest weight possible are to be preferred in general, specifically the greater their effective movement radius, since the moment of inertia of each mass for movement about the centre of a circle is known to increase with the fourth power of the radius.

From this point of view, the delicate and therefore lightweight universal joint or cardan joint is in principle interesting for connection to the arms and to the parallel plate of a delta robot. The maximum pivoting angles that can thereby be achieved, however, are significantly lower in comparison to a ball joint, consisting of a ball head and a complementary ball socket sliding thereon. Because ball joints thus have a larger pivot angle and thereby permit a larger working space, they are now the joint design most used for delta robots.

In the prior art, U.S. Pat. No. 5,333,514, Toyama, discloses a delta robot, the arms and parallel plate of which are connected together via ball joints.

SUMMARY

An advantage for hygienically critical applications is that the ball socket has a relatively very small surface area. As soon as the slightest contaminants begin to be deposited thereon, they are immediately conveyed away by the ball head sliding thereon and simply and efficiently removed from its smooth surface with each regular cleaning.

As a hygienic disadvantage is can be seen in FIG. 5 of U.S. Pat. No. 5,333,514 that the tubular lower arms are open at their end faces. Through these openings, contaminants can penetrate into the interior of the tubes and accumulate there. And because they are relatively well protected against the effect of detergents there, they occasionally become detached when the lower arm is subjected to a high acceleration, such as an otherwise slight collision.

The dirt layer can then detach partially, for example in fragments, or completely from the lower arm and fall onto or into the products or objects to be handled by the delta robot. If this is a food to be packaged or filled, the relevant food regulations may require the destruction of entire batches, even with otherwise slight collisions.

As a hygienic disadvantage is can be seen in FIG. 5 of U.S. Pat. No. 5,333,514 that the tubular lower arms are plugged into complementary tube portions, which are integrally formed on the ball sockets. Due to these tubular portions, the weight of the entire lower arm is noticeably increased without achieving a corresponding gain in resistance to compressive and tensile loads.

For delta robots with maximum requirements on dynamics, the preferred material in the prior art is carbon-fibre-reinforced plastic, in particular for the lower arms. It is also termed CRP, in which the C stands for carbon. In this fibre-plastic composite, carbon fibres, are embedded—usually in multiple layers—in a plastic matrix of thermosets, for example epoxy resin, or thermoplastics, as reinforcement.

CRP components, depending on the design, can be considerably lighter than aluminium or steel parts. A density of about 1.5 g/cm$^3$ of a typical CRP material contrasts with a density of about 2.7 g/cm$^3$ in the case of aluminium and about 7.8 g/cm$^3$ of steel and iron. A typical threshold for the tensile strength is 1,500 N/mm$^2$ in the case of CRP, about 500 N/mm$^2$ in the case of aluminium alloys and about 1,000 N/mm$^2$ in the case of construction steel. This results in a quotient of the two values—that is to say tensile strength as a function of specific density—of 1,000 for CRP, about 185 for aluminium and only about 128 for steel.

Because of this clear superiority of CRP, it is not surprising that, in the prior art, CRP is the preferred material for the lower arms of delta robots. Dynamic delta robots with steel lower arms are not known to date.

A critical disadvantage of parts of CRP is that, on overloading, they hardly deform at all, but fragment. This results in sharp edges, which can lead to injury of the maintenance personnel or to damage.

A further disadvantage of CRP results from the effect of detergents, particularly those with a high oxygen content, on the plastic that bonds the carbon fibres. The plastic can thereby be embrittled, so that small particles break out and the carbon fibre is unprotected from the detergent during the next cleaning. As a result, even at deeper layers, damage that is externally not visible can lead to breaking off of carbon particles. Their mixture with foods can have negative consequences if consumed by humans.

Even in other applications, such as the production of wafers for electronic semiconductors, the carbon fibres can result in rejects and therefore to poor economic efficiency.

As a material that best resists detergents in hygienically critical applications, stainless steel is known in mechanical engineering. Depending on the proportion of carbon and other alloy components, it can even resist very aggressive detergents, and therefore also provide high strength.

In the prior art, German utility model document DE 20 2005 017 588, in sub-claim 10, also discloses a stainless steel surface for a robot in a clean room. The disadvantage of this proposal, however, is that for sealing hollow spaces in the robot arm, a gasket of a different material is proposed; specifically mentioned are, e.g., elastomers such as ethylene-propylene rubber or PTFE (polytetrafluoroethylene). These gaskets can only withstand very effective, and therefore aggressive, detergents for a limited time, and then must be replaced. The more aggressive the detergent, the earlier the gasket can be damaged. As a result, microorganisms can penetrate into the interior and reproduce there. In the continuation—e.g., during ingress and egress of water—the microorganisms can escape together with the water and lead to contamination.

This effect is more intensive in the case of modules of a robot in the vicinity of the products to be moved, because these parts are cleaned far more intensively, i.e. far more frequently than modules remote from the product.

Against this background, it is the object of the invention to develop a delta robot that can satisfy elevated demands on dynamics, hygiene and protection against the effects of a collision, the weight of the components moving on the biggest radius, in particular the lower arms, being minimized and the sensitivity of the robot components, in particular the lower arms against aggressive detergents being as high as possible and in which contamination of the objects or products moved by the delta robot, even in the event of minor collisions, is prevented.

As a solution, the invention teaches that the lower arms in each case have a stainless steel tube, the inner space of which is sealed so as to be watertight by means of a ball head or a ball socket at both ends, and which is plastically deformable.

A very important feature of the invention is thus that, in particular, the lower arms are made of a stainless steel tube. This idea may at first appear trivial to a layperson, but in practice means none other than replacing a CRP tube with a steel tube.

Although that is entirely possible, on its own it has such serious disadvantages that the idea is completely non-obvious to the person skilled in the art. As explained above in the prior art, the specific weight of steel and iron is about 7.8 g/cm$^3$ and therefore about three times the density of CRP at only 1.5 g/cm$^3$.

This, per se, very clear difference is further reinforced by the tensile strength of the material. A typical threshold for the tensile strength is 1,500 N/mm$^2$ in the case of CRP, compared to about 1,000 N/mm$^2$ in the case of steel. Since, in the present case, both parameters are of importance, the quotient of these two values is formed as a yardstick, that is to say the tensile strength in dependence on the specific density. This comparative value is 1,000 for CRP and only 128 for steel. CRP is thus about 8 times "better" suited than steel.

The comparison of the material properties thus prohibits the person skilled in the art from replacing CRP with steel, since the exchange of the material on its own, with an otherwise unchanged design would result in severe disadvantages due to the weight increase and therefore be non-obvious to the person skilled in the art.

If nevertheless the use of steel materials is made the key feature of the invention, then it is only because the person skilled in the art has found relationships that lie in entirely different areas and which entail the apparently trivial change to a steel material for entirely different reasons.

This context is the increased hygienic requirement, which demands almost complete sterility. Various affairs regarding intentionally or negligently infected foods, which are thereby extremely dangerous to humans, have made clear to everyone what high responsibility and therefore great risk are implied by the mass production of foods. It is therefore understandable that great effort must be taken to thoroughly remove all microorganisms. It is therefore understandable that all residues adhering to surfaces must be removed with greater care. It is clear that mechanical action is not sufficient, but that chemical action must be employed to ensure the permanent detachment and removal of all deposits on the surface. As a consequence, the remaining underlying surface must be chemically neutral and highly resistant.

It is a generally widely known fact that these requirements are only met by the materials glass and stainless steel. It is readily understandable that glass is unsuitable for the lower arm of a robot, since the strength of this material is by no means sufficient, and its specific weight is far too heavy. Only stainless steel comes into consideration as a compromise between a satisfactory chemical resistance and satisfactory mechanical load-bearing capacity.

The corrosion protection in the case of stainless steel is based on the formation of a thin chromium oxide layer by the reaction of atmospheric oxygen with the chromium contained in stainless steel. In the production, by treatment of the surface with a so-called pickling agent, the iron and nickel solutions are to a large extent dissolved out and a highly chromium-enriched zone forms close to the surface and on the surface, which forms chromium oxide as a result of contact with oxygen in the ambient air.

If the thin chromium oxide layer is ever damaged, a new chromium oxide layer forms below it due to the continuous access to atmospheric oxygen. The layer is much thinner than a chromium layer applied, e.g., by electroplating, and adheres much better due to the intimate connection of the chromium particles with the other metals of the alloy.

These advantages in corrosion strength are combined by stainless steel with the properties of steel regarding strength, elasticity and plasticity. Steel, however, cannot achieve such high strength as CRP. Only the elasticity and plasticity are higher.

If, therefore, stainless steel is to be tolerated as a material for the lower arms in the interest of optimum hygienic properties, it is the object of the invention, using different measures, to compensate for the resulting extra weight compared to a CRP tube of similar load-bearing strength.

It should be noted that the increased hygienic requirements additionally require that all hollow spaces which can be colonized by microorganisms and where they can reproduce relatively undisturbed are systematically sealed.

For the watertight closure of a CRP tube in the prior art, it is basically necessary to adhesively bond in a closure element. The adhesive necessary for this is always a weak point, since it is attacked and degraded by the aggressive detergents more rapidly than the other regions, which can lead to failure of the joint.

Compared to stainless steel, however, the CRP itself can be inferior to steel in terms of its resistance to detergents, for example those with high acid content, since some types of plastics that adhesively bond the carbon fibres can also be strongly attacked by the detergent. That can lead to the plastic becoming embrittled and cracking, so that under strong accelerations or other small collisions without consequences, fragments from the plastic layers can fall down and, for example, drop into food packaging. As a consequence the carbon fibres are exposed and in the event that, for example, the box covers have been unintentionally left open, are subjected to the impact without protection.

As explained above, it is a principle disadvantage of carbon fibres that they permit practically no elastic deformation under overload, but splinter, releasing fragments and dust.

The evidence of these extremely undesirable particles in foods is very difficult, since they cannot be so easily detected by metal detectors as, for example, metal chips. Another problem is that the particles that have broken out of a CRP tube can be so small that the damage to the tube surface caused thereby can be overlooked in an optical inspection, but the fragment can very well cause damage.

To avoid this extremely disadvantageous effect, the material for the lower arm must be plastically deformable. Thus, a stainless steel grade must be chosen that is not so brittle than particles can chip off in the event of an impact. The object is thus met with the requirement for the least possible consequences of collisions.

A contradictory criterion in the choice of the stainless steel grade thus results from the requirement of the object for maximum dynamics. For this, the weight must be particularly low, but the strength as high as possible for which purpose a particularly strong, and therefore particularly brittle steel is most suitable.

Unlike with the exclusive optimization of the material only for greatest possible dynamics, the additional requirement for a reduction of the consequences of a collision thus necessitates a compromise in the choice of stainless steel grade.

As already repeatedly mentioned, an almost sterile surface of the lower arm necessitates sealing all hollow and interior spaces in a watertight manner so that no microorganisms can colonize them, grow in relative protection, and subsequently emerge en masse.

In the prior art, with the material stainless steel, such a sealing effect against water can be reliably achieved, as has been repeatedly shown by numerous tanks in the production of beverages. A particularly efficient type of connection of two stainless steel parts is that they are welded together, and the invention therefore proposes that, in one embodiment, one end face of the stainless steel tube is welded to a ball head or a ball socket. In this manner, it can be reliably ensured that no liquid penetrates into the interior space of the lower arm.

In a more refined embodiment, this welded seam can not only ensure water-tightness but also all tensile forces from the ball socket or from a ball head lead into the tube. To this end, the weld seam must extend over the entire end face of the stainless steel tube. Of course, the weld seam itself then has the same strength as the stainless steel tube.

The crucial advantage of this is that at the connecting point—unlike in the prior art—the second tube section guided parallel to the tube of the lower arm is eliminated and thereby the weight significantly reduced.

Then, the relatively heavy tube socket, which encloses the lower arm at its end or is inserted into the end of the lower arm, is eliminated. In many cases, the extra weight of the steel tube compared to the CRP tube can already be compensated thereby. This tube socket is an element that is as indispensable as it is heavy for connecting a CRP tube to a ball head or a ball socket of metal.

Just as the carbon fibres are adhesively bonded together by embedding in a plastic layer, so they must also be adhesively bonded to the next, adjacent device. For all forces to be transmitted under tensile loading, too, a minimum surface area is necessary. At the current state of development of plastics, this area is much larger than the cross section through the CRP tube. Adhesive bonding is therefore only possible on the inner wall or outer wall of the tube. As a result, two tubes extend in parallel over the length required for a secure adhesive bond.

Since, in practice, it is not possible to coat all parts of the contacting surfaces with adhesive with reasonable outlay, and to produce an intimate connection between two surfaces, a safety margin for the surface area must be added, which is responsible for a further increase of weight.

In the invention, welding is thus clearly superior to adhesive bonding due to the elimination of the second tube at the joining point. Since the weld seam should be perfectly closed and continuous, it is, in consistent utilization of this principle, an advantageous variant if, from the ball head or ball socket, only a centering spigot or even only three guide lugs project into the stainless steel tube or enclose it, because thereby the perfect centering of the tube with the ball head or ball socket is greatly simplified, but the weight of the ball head or of the ball socket is hardly increased.

In another embodiment, it is also conceivable to connect a stainless steel tube to the ball head or ball socket by soldering or adhesive bonding or shrinking. Part of the ball head or ball socket is telescopically inserted into the stainless steel tube, or encloses it externally. Depending on the quality of the chosen connecting method, it may be necessary in some circumstances to insert an additional gasket ring between the two elements.

However, because, thereby, the weight of the lower arm increases significantly, which impairs the dynamics of the delta robot to an astonishing degree, this unattractive variant is non-obvious to the person skilled in the art.

As a variant for a further reduction of the weight, it is possible that the outer surface of the stainless steel tube is smooth—which is to be preferred in the interest of optimum cleanability—and a plurality of ribs are integrally formed on the inner surface, which extend in the longitudinal direction and are oriented radially. Thereby, with a uniform total weight, the buckling resistance of the tube is increased and the possible pressure loading increased thereby. Since the interior of the tube is outwardly sealed so as to be watertight, undercuts and notches in the interior, which are extremely unwelcome in the case of a hygienically optimized robot, can be provided without problem, since residues can accumulate in the corners, where they are removed from the cleaning efforts.

Alternatively, or additionally to the ribs, other lightweight but co-supporting elements, such as a CRP tube or metal foam, or a bundle of slim tubes can be introduced into the interior of the stainless steel tube for the lower arm.

For hygienically optimum design of a delta robot, it is also important that the outer surface of the housing can be made of stainless steel in the same way as the outer surface of the ball sockets and ball heads. The upper arms are consequently made of stainless steel, at least at the surface.

For the upper arms, it is entirely appropriate also to use stainless steel tubes. Since, in contrast to the lower arms, they are subject not only to compressive and tensile forces, but principally to considerable bending moments, their cross-sections and wall thicknesses are considerably greater than in the case of the lower arms. The influence of these masses on the inertia, however, is orders of magnitude lower than the masses of the lower arms, since, as is known, the effective load inertia moment increases with the fourth power of the movement radius.

To further reduce the weight, it is proposed to produce at least one ball head as hollow body—To achieve adequate strength nevertheless, a plurality of radially oriented ribs can be integrally formed on the inner surface of the hollow ball head. However, any other lightweight but inherently stiff structure, such as metal foam, is also conceivable.

In the current state of the art, the ball socket is part of a hollow ball, which encloses the ball head with an angle of up to 180 degrees. As an alternative embodiment, the invention proposes that the ball socket has two openings, that is to say not only one large opening, with which it is mounted on the ball head, but also a second smaller opening, which is created structurally by "cutting off" the ball-head-like portion of the ball socket. An annular element remains, which, however, has the advantage that, even with the highest acceleration of the delta robot, the points of greatest load are also displaced over a very small range of the ball head. The actual centre point of the tensile and compressive forces is thus limited to a very small range than with a known ball socket with only a single opening.

This variant of the ball socket can be particularly appropriately combined with the variant of the connection of ball head and/or ball socket and the tube of the lower arm described below:

If the ball centre point of the ball head or of the ball socket is displaced with respect to the centre axis of the tube in the radial direction to the extent that the resulting force exerted by the ball head or ball socket runs along the centre axis of the tube, the exerted forces are distributed far more evenly over the tube than in the configuration that was hitherto conventional, as also described here in the cited prior art, in which the geometrical centre of the ball joint is disposed in the centre axis of the tube. Then, specifically, the resulting forces from the ball socket or ball head engage outside the centre axis, which entails a corresponding reinforcement and therefore a weight increase of the tube.

The invention prefers that the ball socket encloses the ball head with an angle of 180 degrees with respect to the ball centre point, because in this embodiment the forces acting transversely to the lower arm are smallest.

It is also preferred that, in the interior surface of a ball socket, and elastic and very slidable plastic layer is introduced. In view of the strict hygienic requirements, this layer is subject to high wear due to the detergents and must therefore be replaced at regular intervals. However, this replacement is a relatively low effort compared to the very clear gain in the slidability of the ball socket and ball head and the resulting lower load of the arms of the robot, which ultimately results in slimmer dimensioning and significantly increased dynamics of the delta robot.

If this plastic layer is mounted as an insert to be separately engaged in the socket, it can also be replaced quickly and inexpensively.

The structurally optimum profile of a lower arm is a tube with a circular cross-section. As cross-section, however, an oval, an ellipse, a rectangle or a polygon can be used.

As drive for a delta robot according to the invention, a rotating servo motor or a linear motor can be used. It is also possible to use a stepping motor or other electrical drive. Hydraulic cylinders or pneumatic cylinders or a piezo-crystal can alternatively be used.

Further details and features of the invention are explained below in greater detail with reference to examples. However, they are not intended to limit the invention but only explain it.

BRIEF DESCRIPTION OF THE DRAWINGS

In schematic view.

DETAILED DESCRIPTION OF ILLUSTRATIVE EMBODIMENTS

Figure 1:
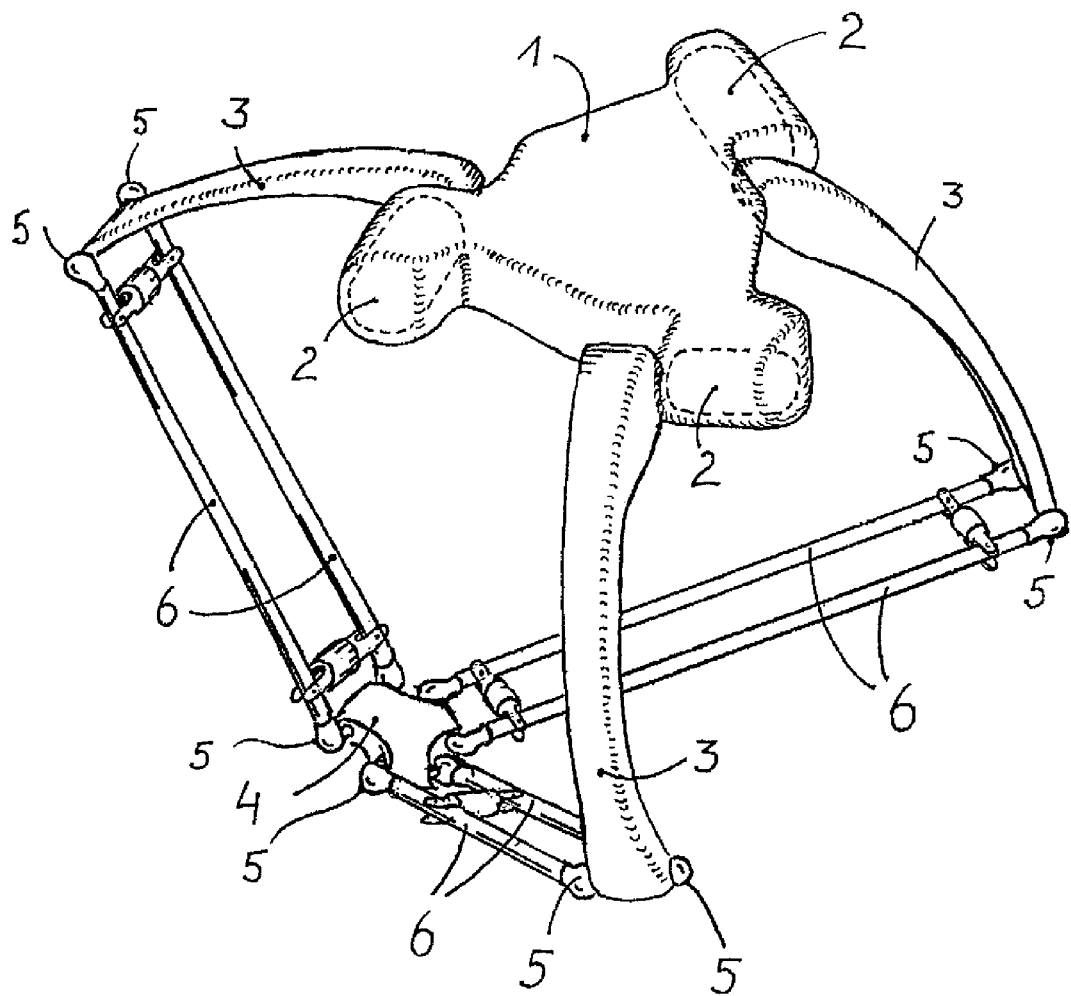
FIG. 1 shows a perspective view of a delta robot.

FIG. 1 shows the schematic diagram of a delta robot according to the invention. In the upper portion of the drawing, the housing 1 can be seen, in which, in this embodiment, three drives 2 are installed. They are completely encapsulated from the exterior by the housing 1. Only their take-off shafts project out and move an upper arm 3 in each case like a crank. At the free ends of each upper arm 3, one pair of stainless steel tubes 6 in each case is connected via ball joints 5. Also via ball joints 5, this pair of stainless steel tubes 6 is connected to the parallel plate 4. Each pair of stainless steel tubes 6 is held together at the upper and at the lower end by means of a permanently elastic element in each case.

Due to the two mutually parallel stainless steel tubes, the parallel plate 4 therefore always remains parallel to the stationary base plate 1, independently of in which positions of the achievable pivot space of the delta robot it moves.

On the parallel plate 4, a good pickup, a tool, a sensor, such as a camera, or another object can be fixed, which determines the actual activity of the delta robot, and is moved by it into the particular desired position.

In FIG. 1, the rounded edge development of the housing 1 can be seen. This prevents excessive amounts of dirt from accumulating in corners and at the edges. Nevertheless, accumulated dirt can be more easily removed.

In FIG. 1, it rapidly becomes clear, that for perfect resistance to the aggressive detergents in the hygienically challenging spaces, not only the lower arms with their stainless steel tubes 6 should be made of stainless steel, but also all other outer surfaces.

FIG. 1 makes clear that this step has the greatest consequences for the lower arms, since they are furthest removed from the stationary housing 1, which is the fixed centre of movement. Based on the fact that a body's moment of inertia is directly proportional to its mass and proportional to the square of the distance from the centre point of the rotational movement, to explain this ratio, that state should be taken at which the centre of gravity of the lower arms is about twice as far from the reference point of the pivotal movement—namely the centre of the housing 1—as the centre of gravity of the upper arms 3. On the assumption of an identical mass both for the lower arms 6 and for the upper arms 3, the effective moment of inertia of the lower arms 6 is four times that of the upper arms 3. This consideration of FIG. 1 makes clear that the weight of the lower arms 6 is a decisive influence on the dynamics of the entire robot.

Figure 2:
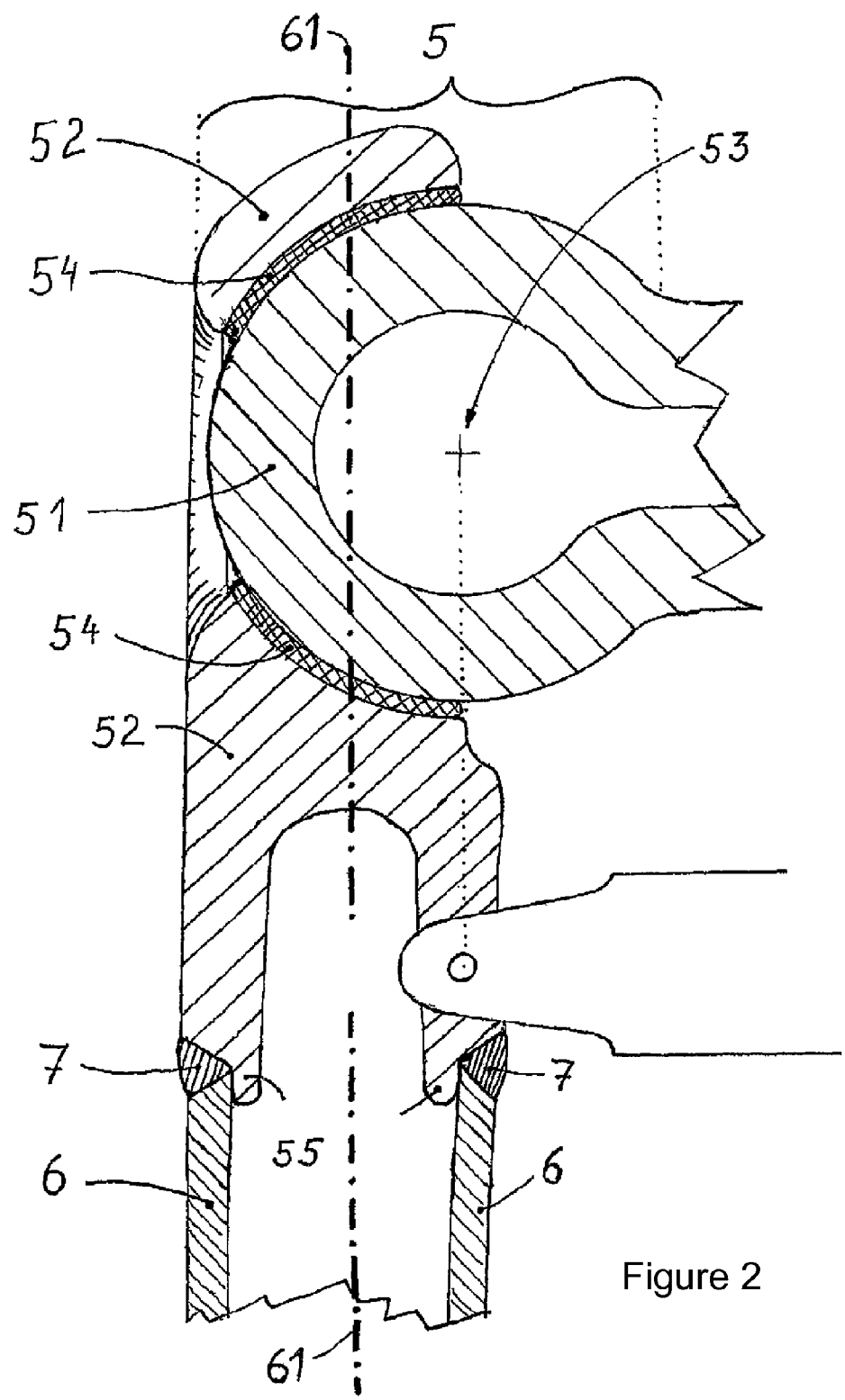
FIG. 2 shows a section through a large ball joint with welded-on stainless steel tube.

FIG. 2 shows a section through a ball joint 5 that is relatively large in proportion to the stainless steel tube 6. The ball head 51 encloses the ball socket 52 with an enclosing angle of approx. 180 degrees, a plastic layer 54 separating the two elements from one another, and the coefficients of static and dynamic friction between the hollow ball and ball segment being considerably improved.

The ball head 51 is fixed on an upper arm 3—not shown here—or on the parallel plate 4—which is also not shown here.

That variant of the ball socket 52 shown in FIG. 2 is provided with two openings, which, in the embodiment shown here, are disposed approximately parallel to one another. As a result, the ball socket 52 no longer completely encloses the ball head 51 on one half, but only on an annular surface around the ball. The advantage of this arrangement can be clearly seen in FIG. 2. In the case of rapid changes to the tensile or compressive forces parallel to the centre axis of the stainless steel tube 6, the components of the forces oriented transversely to the centre axis 61 are all the smaller the greater is the opening of the ball socket 52 drawn at the left.

FIG. 2 shows another advantageous embodiment. In contrast to the prior art, the centre axis 61 of the stainless steel tube 6 does not run through the rotational centre point 53 of the ball joint 5 but outside it. In FIG. 2, it is readily comprehensible that the sum vector of all forces acting in the longitudinal direction of the stainless steel tube 6 runs along the centre line 61 of the tube. As a result, the forces are distributed uniformly on all areas of the wall of the tube 61, so that a slight wall thickness can be chosen, which reduces the weight thereof.

FIG. 2 also shows that the elastic element, such as, for example, a spring, which is drawn with its housing at the bottom right, and which presses the two parallel stainless steel tubes 6 by means of their ball socket 52 on a ball head 51 in each case is not articulated on the centre line of the stainless steel tube 6, but on a line that runs through the centre of rotation 53 of a ball joint 5. Thereby, unnecessary stretching and compressions of the spring are avoided, which permits the necessary margins in the dimensioning of the wall thickness of the stainless steel tube 6 to be dispensed with.

In the embodiment shown in FIG. 2, the stainless steel tube 6 is connected via a weld seam 7 on its end face to the tubular continuation of the ball socket 52. In FIG. 2, it is readily apparent that, into the stainless steel tube 6, there projects only a short centering spigot 55, which is just long enough to ensure perfect centering of the two elements to be connected during production of the weld seam.

Figures 3A, 3B:
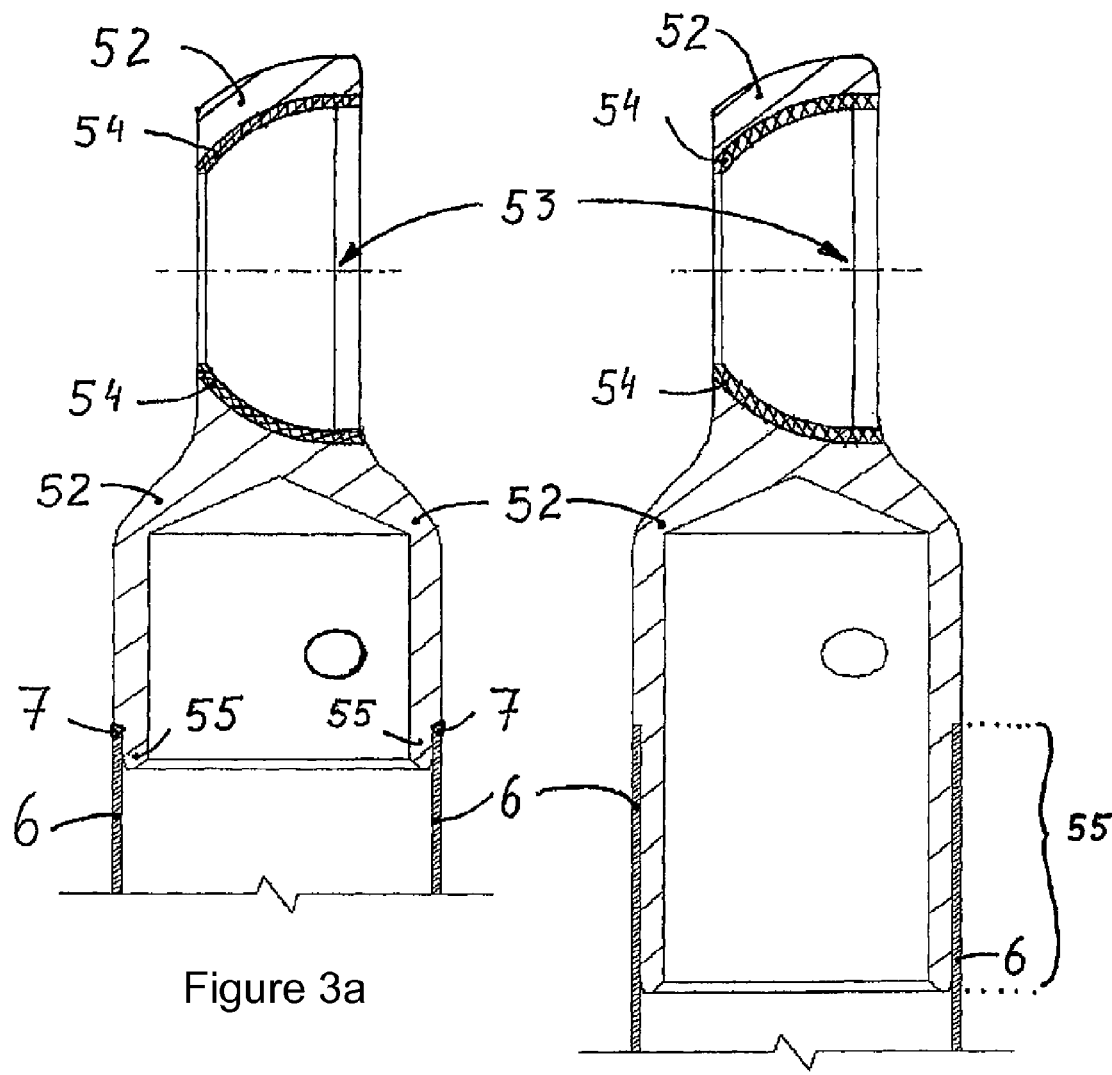
FIG. 3a shows a section through a small ball joint with welded-on stainless steel tube.
FIG. 3b shows a section through a small ball joint with adhesively bonded stainless steel tube.

In FIGS. 3a and 3b, this relationship is made clear once more by means of two different embodiments of the centering spigot 55. FIG. 3 shows a configuration that, in principle, is similar to that in FIG. 2, in section, but with a smaller diameter of the ball joint in ratio to the diameter of the stainless steel tube 6. In the FIG. 3a at the left, the centering spigot 55—as in FIG. 2—is only inserted telescopically into the stainless steel tube by a very short length, which is considerably shorter than the radius of the stainless steel tube 6. Such a short centering spigot 55 serves only for fixing the stainless steel tube 6 during the production of the weld seam 7, which joins the stainless steel tube 6 to the ball socket 52.

In the FIG. 3b drawn at the right-hand side, the otherwise identical ball socket is drastically lengthened in the region of its centering spigot 55, and projects with its centering spigot 55 into the stainless steel tube for a length that approximately corresponds to its diameter. The crucial advantage of this configuration is that, thereby, the contact surface between the tube nozzle at the ball socket 52 and the lateral surface of the stainless steel tube 6 is significantly enlarged. This large area is used for an adhesive layer, which joins the stainless steel tube or another tube to the tube nozzle at the ball socket. It is readily comprehensible that, with an enlargement of the adhesive surface, the load-bearing capacity of this connection is strengthened in direct proportion.

In FIG. 3b, however, the very decisive disadvantage of this configuration can also be very clearly recognized, namely the double length of the tube nozzle at the ball socket 52. In FIG. 3b, it is very readily apparent via comparison with the adjacent FIG. 3a what a huge increase in weight is generated thereby in proportion to the welded connection.

Such a connection is the prior art for adhesive bonding of CRP tubes to the ball socket 52. FIG. 3b, with its adhesive bond, therefore corresponds to the prior art, in which, instead of a stainless steel tube 6, a CRP tube is plugged on and adhesively bonded. The comparison with the attachment of a stainless steel tube to the tube nozzle of a ball joint by means of a weld seam 7, shown in FIG. 3a, shows that, instead, only a drastically shortened centering spigot 55 or even only a few centering lugs are necessary, which permits a correspondingly large reduction of the weight of the ball socket.

In the example shown here, it thus becomes clear that the extra weight of the steel lower arm—the stainless steel tube 6—can only be compensated by the reduced weight of the centering spigot 55, achieved by design measures.

LIST OF REFERENCE CHARACTERS

1 Housing
2 Drives, at least three each in housing 1
3 Upper arm pivotably mounted on the housing 1 and connected to a drive 2
4 Parallel plate, on rods 32
5 Ball joint on rods 32
51 Ball head of the ball joint 5
52 Ball socket, complementary to ball head 51
53 Centre of rotation of a ball joint 5
54 Plastic layer, between ball head 51 and ball socket 52
55 Centering spigot or centering lug, for centering the ball joint 5 in the stainless steel tube 6

6 Stainless steel tube as lower arm, via which a ball joint 5 is connected to the upper arm 3 at one side and to the parallel plate 4 at the other side.
61 Centre axis of a stainless steel tube 6
7 Weld seam connects an end face of the stainless steel tube 6 to a ball head 51 or a ball socket 52

Although the present invention has been described with reference to preferred embodiments, workers skilled in the art will recognize that changes may be made in form and detail without departing from the spirit and scope of the invention.

The invention claimed is:

1. A delta robot for increased requirements on dynamics, hygiene and protection against the consequences of collision, comprising:
   a stationary housing, in which at least three drives are installed;
   at least three elongate upper arms, each of which is connected to one of the at least three drives;
   at least three pairs of elongate and mutually parallel lower arms, each lower arm comprising a stainless steel tube having a first end connected to a free end of one of the upper arms through a ball joint; and
   a movable parallel plate connected to a second end of each of the stainless steel tubes through a ball joint;
   wherein each ball joint comprises a ball head and a ball socket, at least one of which is attached to the first or second end of one of the stainless steel tubes.

2. The delta robot according to claim 1, wherein the ball head or the ball socket of each ball joint is connected to an end face of one of the stainless steel tubes via a weld seam.

3. The delta robot according to claim 2, wherein the weld seam extends over the entire end face of the stainless steel tube.

4. The delta robot according to claim 3, wherein each ball head or ball socket includes a centering spigot or three guide lugs that project into the corresponding stainless steel tube.

5. The delta robot according to claim 4, wherein a ball centre point of the ball head or of the ball socket of at least one of the ball joints is displaced in a radial direction with respect to a centre axis of the stainless steel tube, to which the ball head or the ball socket is attached.

6. The delta robot according to claim 1, wherein a connection between the ball head or ball socket of at least one of the ball joints to one of the stainless steel tubes comprises at least one of a soldered joint, an adhesive bond, and a shrink fit.

7. The delta robot according to claim 6, wherein a part of a component defining the ball socket of at least one of the ball joints is telescopically inserted into one of the stainless steel tubes.

8. The delta robot according to claim 1, wherein at least one of the ball joints includes a ball head that is internally hollow.

9. The delta robot according to claim 1, wherein at least one of the ball sockets comprises two openings and encloses the corresponding ball head approximately annularly.

10. The delta robot according to claim 1, wherein at least one of the ball sockets encloses the corresponding ball head over an angle of about 180° relative to a ball centre point of the ball socket.

11. The delta robot according to claim 1, wherein at least one of the ball joints includes a plastic layer between an interior surface of the ball socket and the ball head.

12. The delta robot according to claim 11, wherein the plastic layer is a plastic insert mounted in the ball socket.

13. The delta robot according to claim 1, wherein at least one of the stainless steel tubes has a profile shape selected from the group consisting of a circle, an oval, an ellipse, and a rectangle.

14. The delta robot according to claim 1, wherein each of the at least three drives is selected from the group consisting of a rotating servo motor, a linear motor, a stepping motor, a hydraulic cylinder, a pneumatic cylinder, and a piezo crystal.

15. The delta robot according to claim 1, wherein each stainless steel tube includes an inner space that is sealed in a watertight manner by the ball head or ball socket attached to the first and second ends of the stainless steel tube.

\* \* \* \* \*